(12) United States Patent
Sankaran et al.

(10) Patent No.: US 11,164,105 B2
(45) Date of Patent: Nov. 2, 2021

(54) INTELLIGENT RECOMMENDATIONS IMPLEMENTED BY MODELLING USER PROFILE THROUGH DEEP LEARNING OF MULTIMODAL USER DATA

(71) Applicant: International Business Machines Corporation, Armonk, NY (US)

(72) Inventors: Anush Sankaran, Bangalore (IN); Neelamadhav Gantayat, Bangalore (IN); Srikanth G. Tamilselvam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 15/810,347

(22) Filed: Nov. 13, 2017

(65) Prior Publication Data

US 2019/0147366 A1     May 16, 2019

(51) Int. Cl.
  *G06N 20/00* (2019.01)
  *G06N 3/04* (2006.01)
  *G06N 5/02* (2006.01)

(52) U.S. Cl.
  CPC .............. *G06N 20/00* (2019.01); *G06N 3/04* (2013.01); *G06N 5/022* (2013.01)

(58) Field of Classification Search
  CPC ............ G06N 3/00; G06N 20/00; G06N 5/00; G06N 3/04; G06N 5/022
  See application file for complete search history.

(56) References Cited

U.S. PATENT DOCUMENTS 6,287,196 B1   9/2001  Kawano
6,463,585 B1  10/2002  Hendricks et al.
(Continued)

FOREIGN PATENT DOCUMENTS

WO    2006036974 A2    4/2006
WO    2010138975 A1   12/2010
(Continued)

OTHER PUBLICATIONS

Narayanan, M., & Cherukuri, A. (Feb. 13, 2016). A study and analysis of recommendation systems for location-based social network (LBSN) with big data. ScienceDirect.com https://www.sciencedirect.com/science/article/pii/S097038961 (Year: 2016).*

(Continued)

*Primary Examiner* — Eric Nilsson
(74) *Attorney, Agent, or Firm* — Ryan, Mason & Lewis, LLP

(57) ABSTRACT

Systems and methods are provided to implement intelligent recommendations to users by modeling user profiles through deep learning of multimodal user data. For example, a recommendation computing platform collects multimodal user data from a computing device of a registered user, wherein the multimodal user data include time-series data, unstructured textual data, and multimedia data. A first deep learning classification engine is utilized to extract features from the multimodal user data. A second deep learning classification engine is utilized to generate a profile of the registered user based on the extracted features. A deep recommendation classification engine is utilized to determine a recommendation for the registered user based on the profile of the registered user, wherein the recommendation identifies at least one additional registered user. The recommendation is presented to the registered user on the computing device of the registered user.

20 Claims, 7 Drawing Sheets

(56) References Cited

U.S. PATENT DOCUMENTS

| | | | |
|---|---|---|---|
| 6,735,568 | B1 | 5/2004 | Buckwalter et al. |
| 7,184,540 | B2 | 2/2007 | Dezonno et al. |
| 7,502,748 | B1 | 3/2009 | Baldwin et al. |
| 7,792,761 | B2 | 9/2010 | Murakami et al. |
| 8,010,546 | B2 | 8/2011 | Terrill et al. |
| 8,245,282 | B1 | 8/2012 | Buckwalter et al. |
| 8,386,481 | B1 | 2/2013 | Croner |
| 8,401,248 | B1 | 3/2013 | Moon et al. |
| 8,583,563 | B1 | 11/2013 | Bonilla et al. |
| 8,984,065 | B2 | 3/2015 | Carter et al. |
| 9,015,088 | B2 | 4/2015 | Shen et al. |
| 2004/0197751 | A1 | 10/2004 | Alexander |
| 2004/0249811 | A1 | 12/2004 | Shostack et al. |
| 2007/0292834 | A1 | 12/2007 | Ransdell |
| 2008/0154895 | A1 | 6/2008 | Carmony |
| 2008/0301557 | A1 | 12/2008 | Kotlyar |
| 2009/0106040 | A1* | 4/2009 | Jones ............... G06Q 30/02 705/319 |
| 2009/0198711 | A1 | 8/2009 | Datar et al. |
| 2009/0311654 | A1 | 12/2009 | Lopez |
| 2012/0149360 | A1 | 6/2012 | Ross et al. |
| 2013/0344464 | A1 | 12/2013 | Mychals |
| 2014/0108308 | A1* | 4/2014 | Stout ............... G06N 3/08 706/12 |
| 2014/0156750 | A1 | 6/2014 | De Cristofaro et al. |
| 2014/0337101 | A1 | 11/2014 | Spears et al. |
| 2015/0359467 | A1* | 12/2015 | Tran ............... A61B 5/0537 600/301 |
| 2016/0110648 | A1 | 4/2016 | Baveja et al. |

FOREIGN PATENT DOCUMENTS

| | | | |
|---|---|---|---|
| WO | 2013154467 | A1 | 10/2013 |
| WO | 2014068567 | A1 | 5/2014 |

OTHER PUBLICATIONS

Andrews, E. (May 19, 2015). Recommender systems for online dating. Semantic Scholar | AI-Powered Research Tool. https://www.semanticscholar.org/paper/Recommender-Systems-for-Online-Dating-Andrews/7fd08aee8f731771b26177fed47ff2b9ee4a6bbf (Year: 2015).*

Zhai, H. (Sep. 1, 2016). Research on image recognition based on deep learning technology. Atlantis Press | Atlantis Press Open Access Publisher Scientific Technical Medical Proceedings Journals Books. https://www.atlantis-press.com/proceedings/amitp-16/25862663 (Year: 2016).*

Portugal, I., Alencar, P., & Cowan, D. (Nov. 17, 2015). The use of machine learning algorithms in recommender systems: A systematic review. arXiv.org. https://arxiv.org/abs/1511.05263 (Year: 2015).*

Mazhari, S., Fakhrahmad, S., & Sadeghbeygi, H. (Feb. 12, 2015). A user-profile-based friendship recommendation solution in social networks. https://journals.sagepub.com/. https://journals.sagepub.com/doi/10.1177/0165551515569651 (Year: 2015).*

Prasad, S. C. (Dec. 18, 2014). Deep recurrent neural networks for time series prediction. arXiv.org. https://arxiv.org/abs/1407.5949 (Year: 2014).*

Singh, S. P. (Mar. 5, 2016). Bilingual automatic text summarization using unsupervised deep learning. IEEE Xplore. https://ieeexplore.ieee.org/document/7754874 (Year: 2016).*

Kuo, C. H. (Feb. 14, 2016). Using deep Convolutional neural networks for image retrieval: Ingenta connect. Home: Ingenta Connect. https://www.ingentaconnect.com/contentone/ist/ei/2016/00002016/00000002/art00014 (Year: 2016).*

Hermoso, R. (Nov. 16, 2015). A review of the role of sensors in mobile context-aware recommendation systems—Sergio Ilarri, Ramón Hermoso, Raquel Trillo-Iado, Maria del Carmen Rodríguez-Hernandez, 2015. SAGE Journals, https://journals.sagepub.com/doi/10.1155/2015/489264 (Year: 2015).*

Aytar, Y. (Oct. 27, 2016). (PDF) SoundNet: Learning sound representations from unlabeled video. ResearchGate. https://www.researchgate.net/publication/309551169_SoundNet_Learning_Sound_Representations_from_Unlabeled_Video (Year: 2016).*

Wu, S. (May 20, 2016). Personal recommendation using deep recurrent neural networks in NetEase. IEEE Xplore. https://ieeexplore.ieee.org/document/7498326 (Year: 2016).*

Peng, Yang, et al. "Multimodal ensemble fusion for disambiguation and retrieval." IEEE MultiMedia (2016). (Year: 2016).*

* cited by examiner

INTELLIGENT RECOMMENDATIONS IMPLEMENTED BY MODELLING USER PROFILE THROUGH DEEP LEARNING OF MULTIMODAL USER DATA

TECHNICAL FIELD

This disclosure relates generally to systems and methods for providing intelligent recommendations by a computing platform.

BACKGROUND

In various types of applications, user profile information is utilized to identify user interests and provide recommendations to users. For example, conventional recommendation systems, such as online matchmaking for matrimonial and dating applications, typically perform compatibility analyses for individuals or groups of individuals based on a predefined set of attributes that are identified as important to the given application domain. The attributes are typically collected using a traditional questionnaire template approach in which users provide self-identified responses to various questions. Conventional recommendation systems that implement compatibility determination techniques based on self-identified responses to questionnaire templates often result in the creation of user profiles with incomplete or inadequate information with regard to user interests and preferences, which can lead to ambiguity and irrelevant recommendations. For example, conventional questionnaire templates provide incentives for users to misrepresent their attributes to influence a desired final outcome. In addition, recommendation systems rely on subject matter experts to identify important attributes or rely on explicit user feedback. Such techniques are ineffective to build user profiles that are truly indicative of user interests for purposes of providing accurate compatibility analysis and other types of intelligent recommendation.

SUMMARY

Embodiments of the invention generally include systems and methods for providing intelligent recommendations to users by modeling user profiles through deep learning of multimodal user data. For example, one embodiment includes a method which comprises: collecting multimodal user data from one or more computing devices of a user that is registered on a recommendation computing platform, wherein the multimodal user data comprise time-series data, unstructured textual data, and multimedia data, and wherein the one or more computing devices are network-connected to the recommendation computing platform; using a first deep learning classification engine to extract features from the multimodal user data; using a second deep learning classification engine to generate a profile of the registered user based on the extracted features; using a deep recommendation classification engine to determine at least one recommendation for the registered user based on the profile of the registered user, wherein the at least one recommendation comprises identification of at least one additional registered user on the recommendation computing platform; and presenting the at least one recommendation to the registered user on at least one of the one or more computing devices of the registered user.

Other embodiments will be described in the following detailed description of embodiments, which is to be read in conjunction with the accompanying figures.

DETAILED DESCRIPTION OF EMBODIMENTS

Figure 1:
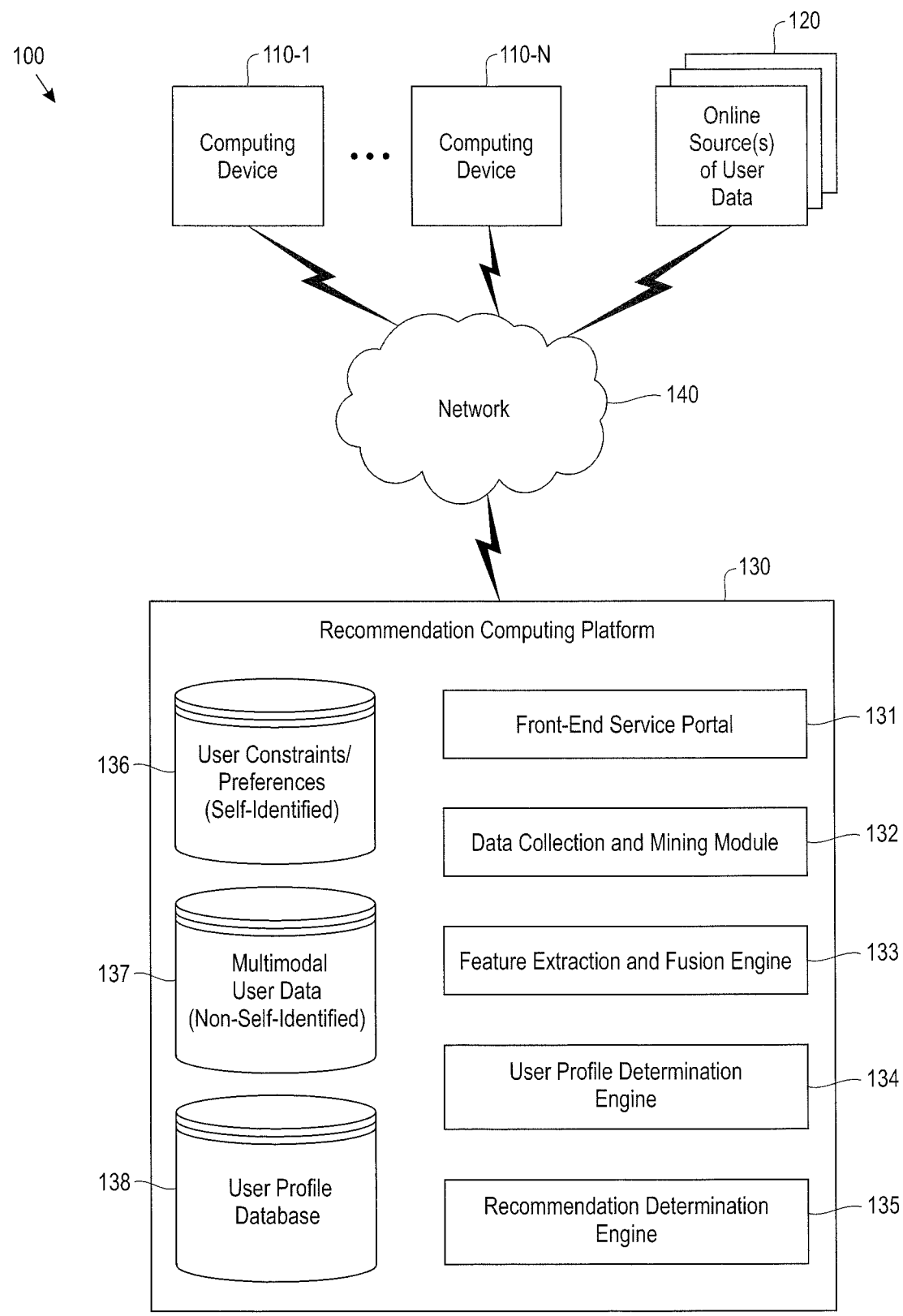
FIG. 1 is a block diagram of a computing system that is configured to provide intelligent recommendations to users by analyzing user profiles generated through deep learning of multimodal user data, according to an embodiment of the invention.

Embodiments will now be discussed in further detail with regard to systems and methods for providing intelligent recommendations to users by modeling user profiles through deep learning of multimodal user data. For example, FIG. 1 schematically illustrates a computing system 100 that is configured to provide intelligent recommendations to users by analyzing user profiles generated through deep learning of multimodal user data, according to an embodiment of the invention. The computing system 100 comprises a plurality of computing devices 110-1, . . . , 110-N (collectively, computing devices 110), one or more online sources of user data 120, and a recommendation computing platform 130, which are connected over a communications network 140. The recommendation computing platform 130 comprises various computing modules including, but not limited to, a front-end service portal 131, a user data collection and mining module 132, a feature extraction and fusion engine 133, a user profile determination engine 134, and a recommendation determination engine 135. The recommendation platform 130 further comprises a plurality of databases/data stores including, but not limited to, a database of self-identified user data 136 (e.g., user-specified preferences/constraints), a database of non-self-identified user data 137 (e.g., multimodal user data), and a database of user profiles 138.

The communications network 140 may comprise any type of communications network (or combinations of networks), such as a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The computing devices 110 comprise various types of user computing devices such as smart phones, smart watches (and other types of smart wearable devices), electronic tablets, laptop computers, etc., which serve as data sources for multimodal user data that are collected and processed by the recommendation computing platform 130 to generate user profiles of registered users. The online sources of user data 120 comprise social network web sites, e-mail servers, user blogs, etc., and other online sources of user data that can be accessed by the recommendation computing platform 130 to collect user data of registered users to generate user profiles of registered users.

In general, the recommendation computing platform 130 is configured to collect various types of multimodal user data and utilize deep learning techniques to (i) extract features from the multimodal user data to generate user profiles, and (ii) process the user profiles to provide intelligent recommendations to registered users. While the recommendation computing platform 130 is generically illustrated in FIG. 1 for illustrative purposes, it is to be understood that the computing modules 131, 132, 133, 134, and 135 of the recommendation computing platform 130 may be distributed over a plurality of computing nodes (e.g., a cluster of servers, virtual machines, etc.) that collectively operate to implement the functions described herein. In addition, the various databases 136, 137 and 138 may be implemented using any suitable type of database system (e.g., structured query language (SQL), non-SQL, etc.) and supported by any suitable data storage system or combination of data storage systems, including, but not limited to storage area network (SAN) systems, direct attached storage (DAS) systems, a serial attached storage (SAS/SATA) system, as well as other types of data storage systems comprising clustered or distributed virtual and/or physical infrastructure.

In this regard, the recommendation computing platform 130 may be implemented in a data center or be a cloud computing platform that performs data computing and data storage functions to support one or more intelligent recommendation applications (consumer or business applications) to provide services to multiple end users, service providers, and/or organizations. For example, the recommendation computing platform 130 can be configured to provide one or more different types of services including, but not limited to, targeted advertisement to end users, insurance recommendations to users, banking recommendations (e.g., eligibility for credit card, loan, etc.), immunity detections (disease analysis), compatibility analysis and recommendations for online dating, matrimonial, roommate matching, etc.

The computing modules 131, 132, 133, 134, and 135 of the recommendation computing platform 130 perform various functions to support intelligent recommendation services to registered users. For example, the front-end service portal 131 is configured to implement device interfaces that enable the computing devices 110 to connect and communicate with the recommendation computing platform 130, as well as graphical user interfaces that enable users to register with, and access services provided by, the recommendation computing platform 130. As part of a user registration process, the front-end service portal 131 may be configured to provide a questionnaire or otherwise request a user to answer a series of questions that are designed to acquire explicit user information regarding user interests, preferences, and conditions (self-identified responses), such as contact information, geographical location (e.g., residence location), occupation, education, interests, hobbies, personality traits, qualities, etc., as well as explicit conditions that are utilized as part of a recommendation analysis for the target applications. For example, for social matching applications, an explicit user condition/constraint may be one in which the user explicitly indicates his/her desire to be matched with another individual who is no less than, or no greater than a certain age, or who does not smoke, etc. The self-identified responses which are provided by a user during an initial user registration process, or which are modified/updated at some time after the initial registration, are stored in the user constraints/preferences database 136 and associated with a user identifier (ID) of the registered user.

The data collection and mining module 132 comprises methods that are configured to access various sources of user multimodal data and collect/mine the multimodal user data to identify user information that may be relevant and useful in determining a user profile. As explained in further detail below with reference to the example embodiment of FIG. 2, the multimodal user data comprise various types of user data such as time-series data, unstructured text data, multimedia data, etc. The multimodal user data are collected from the computing devices 110 and the online sources of user data 120 of registered users. The multimodal user data that are deemed relevant and useful in determining user profiles are stored in the database of multimodal user data 137 and associated with registered users by registered user IDs.

To facilitate and provide added support for the data collection and mining functions of the data collection and mining module 132, the recommendation computing platform 130 can download client-side software to the computing devices 110 as part of the user registration processes. The client-side software may comprise cookies, tracking scripts, client side agents, and scripts/programs that are configured to monitor user actions and perform data analytics functions that support the data collection operations discussed herein. For example, the client-side software can be configured to acquire and process multimodal data that are generated by, or otherwise stored on, the user computing devices 110, including, but not limed to a user's phone and email contacts, call logs, internet browsing history and other related data, calendar data, geo-location data, user interactions on social networks, etc. Various types of multimodal user data that can be collected and utilized by the recommendation computing platform 130 will be discussed in further detail below with reference to FIG. 2.

The feature extraction and fusion engine 133 comprises methods that are configured to perform deep classification analysis on multimodal data of a registered user (which is collected and stored in the database of multimodal user data 137) to extract various features that are indicative of a user's preferences, activities, interests, etc., which may not be self-identified. For example, in one embodiment, different types of deep learning classification techniques are utilized to process different types of multimodal user data (e.g., time-series data, unstructured text data, multimedia data, etc.) to generate feature sets for each type of multimodal user data. In addition, the feature extraction and fusion engine 133 comprises methods that are configured to perform feature level fusion to aggregate/combine corresponding features from each of the feature sets generated by the different deep learning classification techniques to generate a multidimensional feature vector which provides a unified representation of the user's preferences, activities, interests, etc., based on extracted features.

As explained in further detail below, the feature extraction methods are implemented by applying different types of deep classification techniques applied to different types of multimodal data to extract multiple features of deep psychological and personality traits that are indicative of an individual's preferences, activities, interests, etc., such as, but not limited to, assertiveness, ambition, curiosity, emotional responses, opinions, interests, religious views, and various other types of user patterns of user behaviors. For example, other types of features that may be relevant to assessing a user's preferences, activities, interests, etc., comprise information related to (i) health consciousness (e.g., food types, eating habits, frequent/infrequent doctor/dentist visits, etc.), (ii) verbal behaviors (interactions with others, language, vocabulary), and (iii) financial behaviors (e.g., thriftiness, spending habits, debt, entrepreneurial activities), etc. which may be determined from deep classification analysis of multimodal user data including, but not limited to, call logs, on-line chats, text messages, e-mails, blogs, online posts, visited locations, calendar activities, etc.

The user profile determination engine 134 comprises methods that are configured to generate user profiles for registered users based on features that are extracted from the multimodal data of the registered users. As discussed in further detail below, in one embodiment, the user profile determination engine 134 implements deep learning classification techniques to classify a user's preferences, activities, interests, etc., and generate a model of the user's preferences, activities, interests, etc., which is stored as a user profile in the user profile database 138 and associated with the user ID of the registered user. Over time, the profile of a given registered user can be updated based on changes in user behaviors (physical and mental behaviors) that are learned through continued capturing and processing of new multimodal data of the registered user.

The recommendation determination engine 135 comprises methods that are configured to process the user profiles in the database 138 to generate intelligent recommendations to registered users based on their corresponding user profiles. As discussed in further detail below, in one embodiment, the recommendation determination engine 135 implements deep learning classification techniques to provide intelligent recommendations for a target application. For example, in one embodiment of the invention where the recommendation computing platform is designed for matching individuals for dating, the recommendation determination engine 135 is configured to perform compatibility analysis among multiple registered users by using deep learning classification techniques to generate match probabilities based on user profiles of the registered users. In one embodiment, a compatibility analysis is performed using self-identified information (user constraints/preferences) of the registered users which are obtained through self-identified responses and maintained in the database 136.

Figure 2:
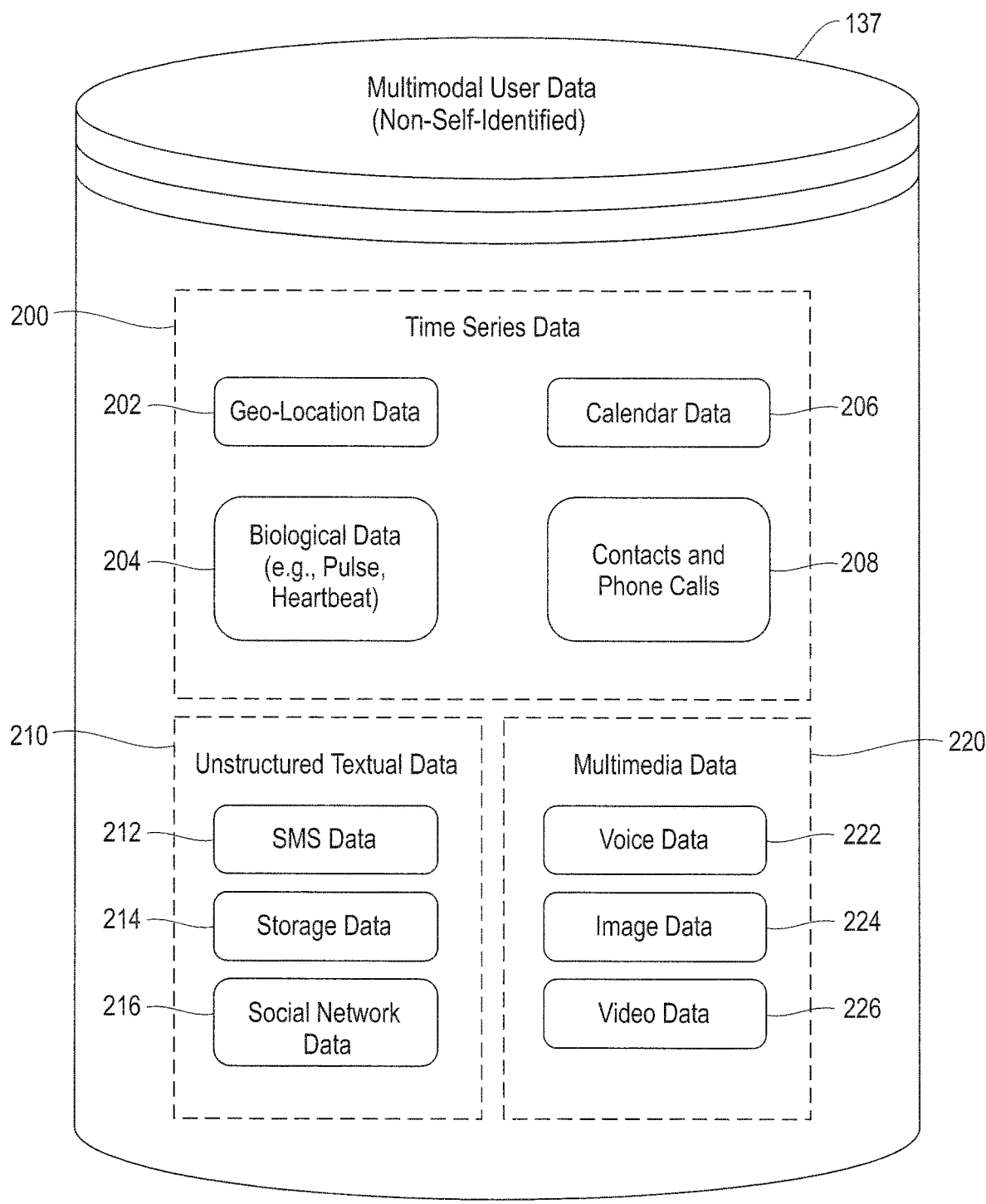
FIG. 2 illustrates various types of multimodal data that can be utilized to generate models of user profiles, according to an embodiment of the invention.

FIG. 2 illustrates various types of multimodal data that can be utilized to generate models of user profiles, according to an embodiment of the invention. More specifically, FIG. 2 illustrates various types of user data that can be collected from computing devices of registered users or online data sources associated with registered users, and stored in the database of multimodal user data 137 shown in FIG. 1. The multimodal user data comprise time-series data 200, unstructured textual data 210, and multimedia data 220. The time-series data 200 comprise geo-location data 202, biological data 204, calendar data 206, and time-series data related to user contacts and phone calls 208. The unstructured textual data 210 comprise short message service (SMS) data 212, storage data 214, and social network data 216. The multimedia data 220 comprise voice data 222, image data 224, and video data 226.

For illustrative purposes, the following discussion assumes that the multimodal data shown in FIG. 2 corresponds to a single registered user, although it is to be understood that the same or similar types of multimodal data are maintained for all registered users in the database of multimodal user data 137. The multimodal time-series data 200, unstructured textual data 210, and multimedia data 220 that are collected for a given registered user comprise various types of data from which relevant information (e.g., features) can be extracted to determine the interests, opinions, behaviors, and behavioral orientations of an individual, etc., and thereby characterize and model the user based on such information.

For example, the time-series geo-location data 202 comprise geographical location information (e.g., latitude and longitudinal coordinates) regarding the physical locations of the user's computing device over a period of time. Such information can be obtained using a location services application that executes on the computing device (e.g., smart phone) of the user, in conjunction with a GPS (global positioning satellite) system to determine and track the physical locations (e.g., latitude and longitudinal coordinates) and times of such physical locations of the computing device of the user. The geo-location data 202 may be stored as a sequence of n data points, wherein each data point comprises location information (latitude, longitude) and associated location time information. This type of information can be used to determine different locations where the user has visited over time, the frequency at which the user has been to a given location, etc. The geo-location data 202 can provide information that identifies travel interests of a given user, and associated events attended by the user, etc.

The time-series biological data 204 comprise physiological information for the given user which can be captured over time through wearable devices and sensors such as smart watches, activity tracker devices, wearable medical monitoring devices, and other similar wearable wireless devices having integrated sensors that are configured to measure an individual's physical activity and physiological information, etc. Such information may comprise, but is not limited to, pulse rate, heartbeat, breathing rates, stress level, different types of brain activity, etc. For example, activity tracker devices comprise dedicated devices and smart watches having sensors that can measure an individual's heart rate, distance traveled, speed, altitude, calorie consumption, sleep patterns, etc. In this regard, the time-series biological data 204 can be used to determine a user's fitness condition, exercising style and routines, sleep patterns (e.g., determine if the person is a night owl or early riser, etc.).

The time-series calendar data 206 for a given user comprise information that can be obtained from a time-management and scheduling calendar service that executes on a computing device of the given user. The calendar data 206 can analyzed to determine various activities that the person may be involved with on a regular basis or a one-time basis, which are indicative of user preferences, activities, interests, etc. The calendar data 206 may comprise information that identifies travel interests of a given user, and associated events attended by the user. In addition, significant use of a calendar application, per se, by a person can be an indication that the person is a well-organized person.

The time-series contacts and phone call data 208 comprise data regarding a history of telephone calls that the user has made and received over time, as well as the known contacts of the persons that are the subject of such calls. The time-series contacts and phone call data 208 can be obtained from call logs and contact lists that are stored on the user's smart phone, for example. This type of information can be used to determine various types of user behaviors. For example, if a person speaks with his/her parents or family members on a regular basis, this can be an indication that the person is a family-oriented person. If the person speaks with friends on a regular basis, this can be an indication that the person is very socially active and friendly. In addition, the time-series contacts and phone call data 208 can be used to determine if an individual is an introvert or an extrovert based on the number and frequency of phone calls, the amount of time spent on telephone calls, etc.

The unstructured textual data 210 comprise various forms of textual data that can be utilized to characterize and model the preferences, activities, interests, etc. of the user. For example, the SMS data 212 comprise textual data that are extracted from text messages that are sent and received via a text messaging application executing on the computing device of the user. The storage data 214 comprise textual data that can be obtained from text documents, e-mails, and other files stored in memory of the computing device of the user. A person's financial stability, health conditions, etc., can be mined from financial reports and health alerts in SMS data 212 and storage data 214 and converted to structured formats.

The social network data 216 comprise text data that are extracted from user chats, blogs, comments, etc., that are made by the user on one or more social networks or online blog sites, etc. The social network data 216 comprise information that identifies a social presence of the user, a user's social responsibility index, etc. Collectively, the various forms of unstructured textual data 210 of a given user can be analyzed to detect certain keywords and/or phrases in the unstructured textual data, which provide relevant information and context for determining various aspects of a user's preferences, activities, interests, etc.

The multimedia data 220 comprise various forms of voice data, image data and or video data that can be utilized to characterize and model the preferences, activities, interests, etc. of the user. For example, the voice data 222 comprise information that can be extracted from audio (verbal) data that are captured via a microphone on the user's computing device. The voice data 222 may comprise snippets of voice data of a user which are captured when the user is engaged in a voice conversation/communication (e.g., phone call, video call, voice over IP (VoIP) call, etc.) using a computing device of the user. The voice data 222 may also comprise audio files of voice notes or voice messages that are generated and stored on a computing device of the user. The computing device of the user may comprise a voice data buffer which temporarily stores voice data 222, and which is subsequently processed using an automatic speech recognition (ASR) system that is configured to process the voice data 222 and transcribe the voice data 222 to text data. The transcribed voice data of a given user can be analyzed to detect certain keywords and/or phrases in the transcribed voice data, which provide relevant information and context for determining various aspects of a user's preferences, activities, interests, etc.

The image data 224 comprises image files that can be processed using various types of image processing techniques to extract relevant information and context from the image data, which can be used for determining various aspects of a user's preferences, activities, interests, etc. For example, images of the user can be captured and processed to determine facial expressions of the user that are made by the user in response to certain stimuli (e.g., smiling or frowning by a user while viewing something can be indicative of user interests, or dislikes, etc.). In addition, the image data 224 of a user can be processed to extract various information regarding places that the user has visited, acquaintances of the user, social activities of the user, etc. Similarly, the video data 226 may provide information indicative of user preferences, activities, interests, etc. with regard to places visited by the user, user emotions, events attended by the user, etc. The image data 224 and video data 226 can also provide information regarding genre preferences of the user, and aesthetic profiles of the user, etc.

As noted above, the various forms of multimodal data that are collected from computing devices and online data sources of a given user can be collected using client-side programs/scripts which are downloaded from the recommendation computing platform 130 (FIG. 1) during user registration, or otherwise obtained from third party sources. The client-side programs/scripts can be configured to collect user multimodal data from local services operating on the computing device of the user, and to collect user multimodal data during user interactions with a remote service, e.g., a social network site or other website, that the user communicates with using the computing device of the user. The user can control/limit the types of user data that are collected remotely on the user's computing device and remotely from social network sites, through an application permissions service of a native operating system of the user's computing device.

Collectively, the multimodal time-series data 200, unstructured textual data 210, and multimedia data 220 of a given user can be processed using deep learning classification systems to extract features that are indicative of interests, opinions, behaviors, behavioral orientations of an individual, and utilize the extracted features to characterize and model the preferences, activities, interests, etc., of the user. For example, the multimodal user data can be utilized to determine religious interests and food interests of person. By way of specific example, a person's religious orientation can be determined from religious locations that user visits, the frequency at which the user visits such religious locations, the manner in which a user celebrates religious holidays and events, etc. By way of further example, the multimodal data can be used to characterize a user's food habits through relevant information such as the types of restaurants that the user visits, what types of foods the user like to eat, etc.

Furthermore, user opinions on various topics and issues, such social issues, religious issues, political issues, educational issues, family issues, etc., can be mined from phone logs, online blogs, reactions/comments on social networks, and other types of multimodal data. In addition, the multimodal data can be processed to determine various behaviors of the user, including, but not limited to, health, verbal, emotional, group, and financial behaviors. In particular, identifying health behaviors of person (e.g., food habits, doctor visits, frequency of exercising, etc.) can provide information that is indicative of the person's quality of life. A person's verbal behavior can be identified from chat logs, text messaging, etc., to determine how the person interacts with other individuals. A person's emotional state and behavior (feelings of fear, excitement, joy, sorrow or anger) can be identified from comments and posts on social networking sites. A person's group behavior can be identified by the person's association and/or membership in certain communities and groups. A person's financial behavior can be determined by analyzing expenditure logs (e.g., financial spreadsheets stored on the user computing device), online purchasing habits, and other financial aspect of the user obtained from user texting/voice conversations, etc.

Figure 3:
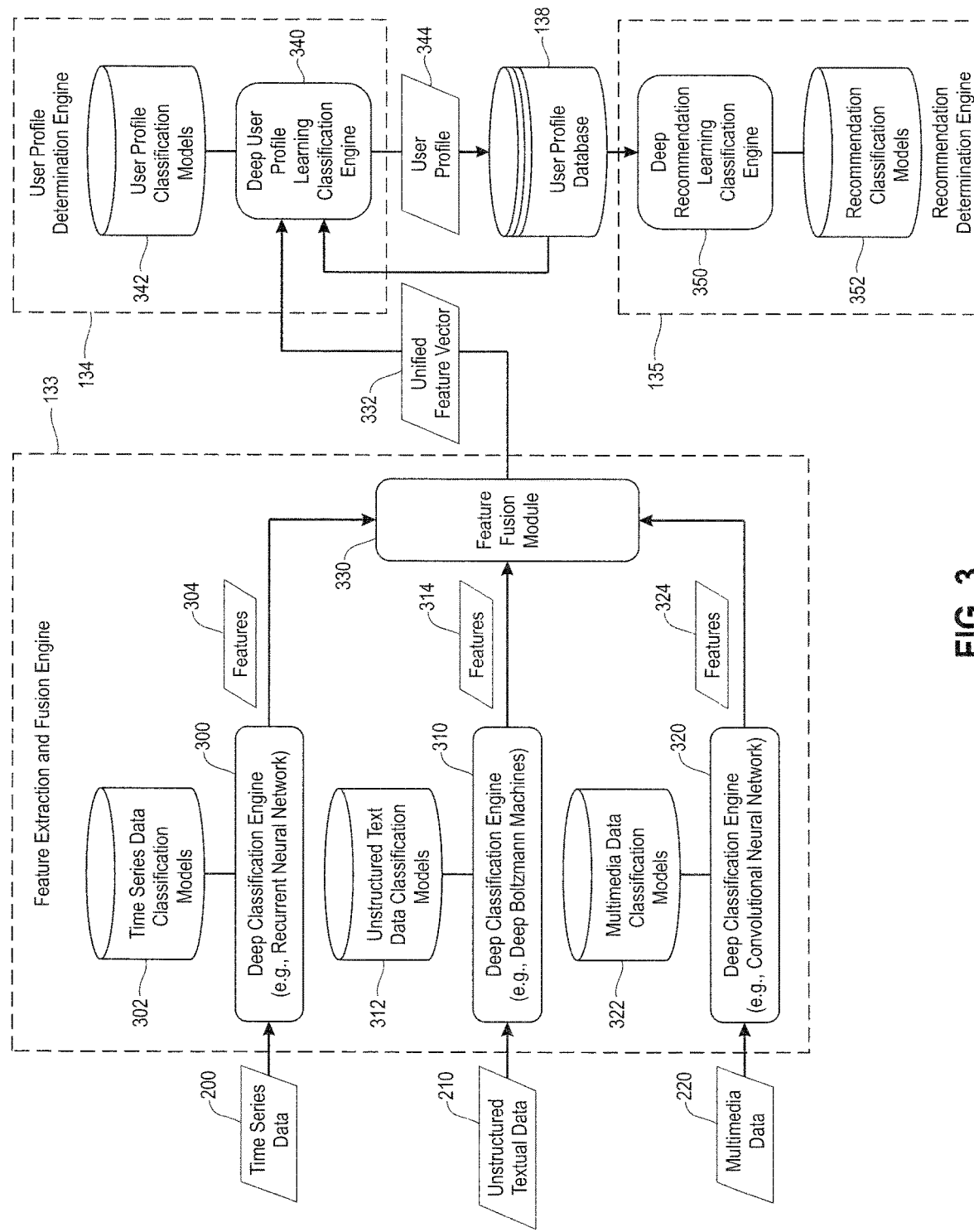
FIG. 3 is a block diagram that illustrates details of processing modules and operational modes of the computing system of FIG. 1, according to an embodiment of the invention.

FIG. 3 is a block diagram that illustrates details of processing modules and operational modes of the computing system of FIG. 1, according to an embodiment of the invention. In general, FIG. 3 illustrates system and methods that are configured to process multimodal time-series data 200, unstructured textual data 210, and multimedia data 220 of a given user using deep learning classification systems to extract features that are indicative of interests, opinions, behaviors, and behavioral orientations of an individual, and utilize the extracted features to characterize and model the preferences, activities, interests, etc. of the user. In particular, FIG. 3 schematically illustrates details of the feature extraction and fusion engine 133, the user profile determination engine 134, and the recommendation determination engine 135 of the recommendation computing platform 130 of FIG. 1, according to embodiments of the invention.

As shown in FIG. 3, the feature extraction and fusion engine 133 comprises a first deep classification engine 300, a second deep classification engine 310, and a third deep classification engine 320, and a feature fusion module 330. The first deep classification engine 300 is configured to utilize trained time-series data classification models 302 to extract features 304 from the time-series data 200 of a given user, which are indicative of various aspects of the user's preferences, activities, interests, etc. The second deep classification engine 310 is configured to utilize trained unstructured text data classification models 312 to extract features 314 from the unstructured textual data 210 of the given user, which are indicative of various aspects of the user's preferences, activities, interests, etc. The third deep classification engine 320 is configured to utilize trained multimedia data classification models 322 to extract features 324 from the multimedia data 220 of the given user, which are indicative of various aspects of the user's preferences, activities, interests, etc.

In one embodiment, the deep classification engines 300, 310, and 320 utilize different types of deep classifiers that are optimal to process different types of multimodal information. For example, the first deep classification engine 300 can utilize convolutional neural networks (CNNs) to process time-series data 200, the second deep classification engine 310 can utilize deep Boltzmann machines (DBMs) to process unstructured textual data 210, and the third deep classification engine 320 can utilize recurrent neural networks (RNNs) to process multimedia data 220. CNNs are well-suited for handling time-series classification of data which, by nature is of high dimensionality, is large in data size, and is continually updating. In addition, DBM classifiers are well-suited for modeling and extracting features from a large collection of unstructured text data sources, and CNNs are well-suited for extracting visual features from image data and extracting features from voice data.

The feature fusion module 330 is configured to generate and output a unified feature vector 332 representation of user preferences, activities, interests, etc. The unified feature vector 332 is generated by fusing (combining/aggregating) the various features 304, 314, and 324 extracted from the multimodal data 200, 210, and 220. In one embodiment, the unified feature vector 332 comprises a multi-dimensional vector of features which represent user preferences, activities, interests, etc. Each feature of the unified feature vector 332 represents one of a plurality of different components (e.g., psychological/personality traits/behaviors of a user), which are indicative of different aspects of user preferences, activities, interests, etc. For example, one feature may represent a health consciousness aspect of the user, while another feature may represent a financial responsibility of the user, while yet another feature may represent an emotional state of the user, etc. Furthermore, one or more or all features of the multi-dimensional unified feature vector 332 may also be multi-dimensional features. For example, a feature of the unified feature vector 332 which represents a user's health consciousness may comprises multiple sub-features related to e.g., food habits, sleep habits, exercise habits, etc., which collectively are representative of an overall health consciousness or behavior of the user.

As part of the feature fusion process, the feature fusion module 330 may be configured to extract and aggregate, from each set of features 304, 314, and 324, all features that correspond to each of the different types of features represented in the unified feature vector 332. For example, one or more or all of the feature sets 304, 314, and 324 may comprise different types of information that are indicative of the user's health consciousness, wherein the user's health consciousness is one dimension that is included in the unified feature vector 332 representation of the user's preferences, activities, interests, etc. In this regard, the feature fusion module 330 is configured to extract and combine all of the different types of information (contained in the feature sets 304, 314, and 324) that are indicative of the user's health consciousness into the corresponding feature (dimension) of the unified feature vector 332.

The user profile determination engine 134 comprises a deep user profile learning classification engine 340, and trained user profile classification models 342. The deep user profile learning classification engine 340 is configured to utilize the trained user profile classification models 342 to generate a user profile 344 based on the unified feature vector 332 representation of the multimodal user data. The user profile 344 for a given registered user is stored in the user profile database 138. The user profile 344 which is generated can be a new user profile (for a new registered user), or an updated/modified user profile which is updated based on current collection of multimodal user data of the registered user. The user profile 344 comprises a high-level characterization/classification of a user's preferences, activities, interests, etc. based on the multi-dimensional feature data that is included in the unified feature vector 332 of the given user.

The recommendation determination engine 135 comprises a deep recommendation learning classification engine 350, and trained recommendation classification models 352. The deep recommendation learning classification engine is configured to utilize the trained recommendation classification models 352 to provide intelligent recommendations to a given user based on a current user profile of the given user that is maintained in the database of user profiles 138. As noted above, the type of analyses and intelligent recommendations that are provided by the recommendation determination engine 135 will vary depending on the target application. For example, for dating or matrimonial matchmaking applications, the deep recommendation learning classification engine 350 will process the profiles of registered users based on the recommendation classification models 352 to classify the profiles of the registered users. The recommendation determination engine 135 utilizes the profile classification results of the registered users to determine a level of compatibility between the profile of a given user and the profiles of other registered users. In other words, in one embodiment, the recommendation determination engine 135 is configured to perform compatibility analyses using deep learning of user models.

In one embodiment of the invention, unsupervised deep learning classification techniques are utilized to implement intelligent recommendation applications based on modeling of user preferences, activities, interests, etc. from multimodal user data. For example, in the context of an intelligent recommendation computing system shown in FIG. 3, the use of deep learning techniques is particularly useful as deep learning allows for unsupervised training of the various classification models 302, 312, 322, 342, and 352, which are utilized to perform the inference processing/analysis functions of the respective deep classification engines 300, 310, 320, 340, and 350, wherein the unsupervised learning does not require manual (supervised) feature engineering.

Furthermore, the use of deep learning applications is particularly advantageous for use with intelligent recommendation applications as discussed herein which require the collection and processing of a significantly large amount of multimodal user data that are collected from registered users and stored in the database of multimodal user data 137 (FIGS. 1 and 2), which is utilized to train and optimize the deep learning models 302, 312, and 322 that are used for the deep inference processing functions performed by the respective engines 300, 310, and 320. Indeed, deep learning provides effective ways to represent and combine information from multimodal data sources, as well as learn complex relationships across multiple data sources, which are difficult to infer manually or through specified rules.

In addition, deep learning models such CNNs and RNNs typically have a significant amount of model parameters (weights) that need to be generated and updated on a regular basis as new training data are collected and analyzed over time. For example, after the initial classification models 302, 310, 322, 342, and 352 are created, unsupervised machine learning techniques can be applied to automatically update the classification models 302, 312, and 322 over time based on new multimodal user data that are collected over time. In addition, the user profile classification models 342 and the recommendation classification models 352 can be updated over time as the system acquires more knowledge of the user and is able to better analyze the user's preferences, activities, interests, etc. to provide more accurate recommendations.

Indeed, with regard to unsupervised machine learning algorithms, as is known in the art, unsupervised machine learning can rely on training data to build a classification model to which newly acquired data are applied. In addition, unsupervised machine learning techniques utilize data clustering techniques to cluster similar data or features, and do not rely on pre-defined labels to perform actual training and classification. The deep learning methods are configured to build models by extracting high-level, complex abstractions as data representations through a hierarchical learning process, which can adapt over time based on new training data. The complex abstractions are learned at a given level based on relatively less complex abstractions formulated in a preceding level in the hierarchy. The deep learning methods are used to analyze and learn patterns from massive amounts of training data that are acquired over time.

Figure 4:
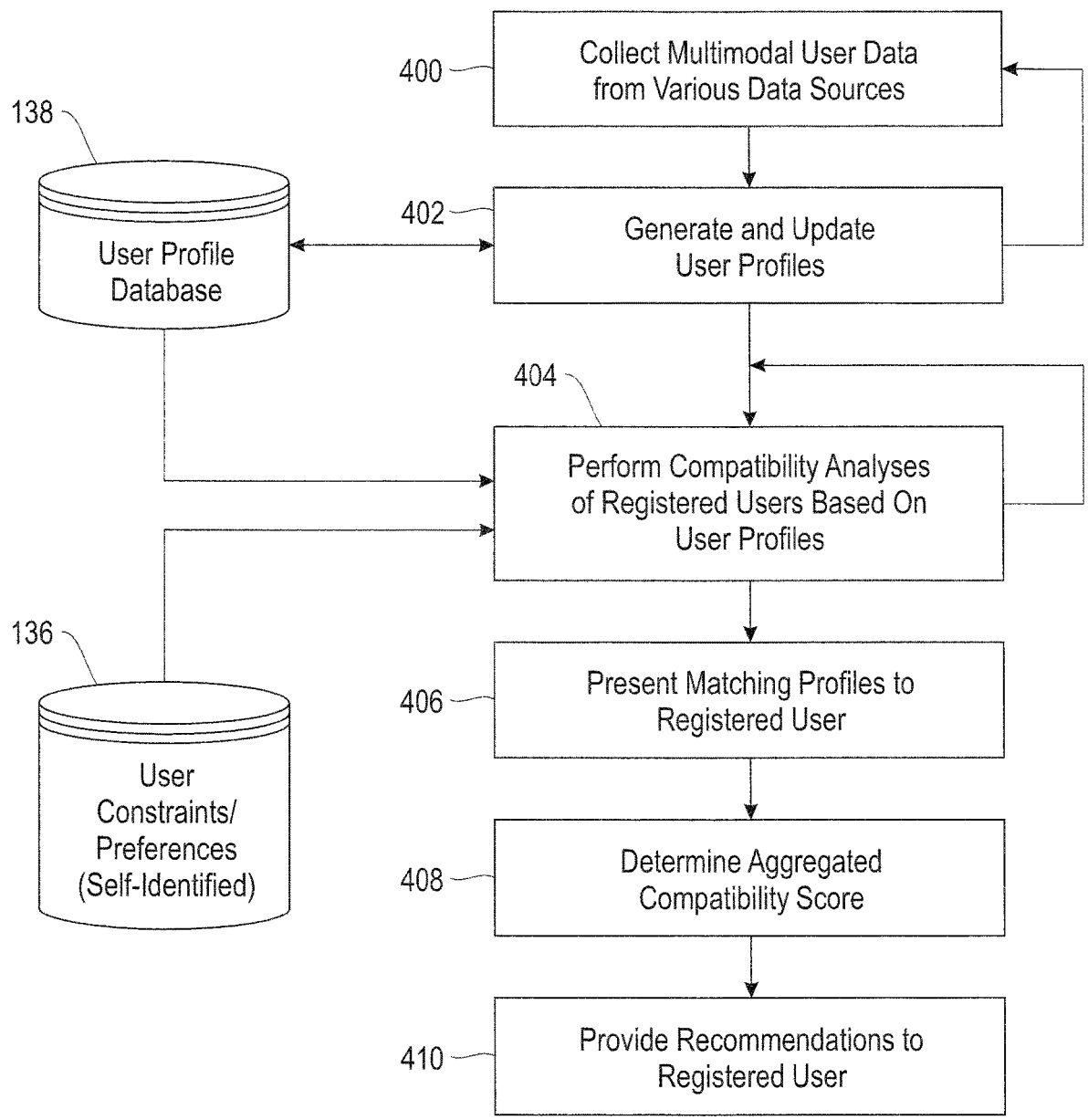
FIG. 4 is a flow diagram of a method for generating and utilizing user profiles to perform compatibility analyses and provide recommendations to users, according to an embodiment of the invention.

FIG. 4 is a flow diagram of a method for generating and utilizing user profiles to perform compatibility analyses and provide recommendations to users, according to an embodiment of the invention. In particular, FIG. 4 illustrates an exemplary application of the recommendation computing platform 130 of FIG. 1 in the context of match making for on-line dating applications. The recommendation computing platform 130 collects multimodal user data for registered users from various data sources (e.g., computing devices, social media sites, etc.) (block 400). The recommendation computing platform 130 processes the multimodal user data using deep learning methods as discussed above to generate and/or update user profiles (block 402) which are stored in the user profile database 138. The process flow of steps 400 and 402 is continuously repeated to collect new multimodal data of registered users over time, and update/modify the user profiles of registered users over time. This continual process (blocks 400 and 402) of collecting and processing multimodal user data of registered users to update user profiles is based on the fact that a user's profile (e.g., interests, behaviors, and other aspects of a user) can change over time (e.g., over a period of weeks, months, etc.). In addition, the continuous collection of multimodal user data results in generating a large dataset of training data that is utilized by the recommendation computing platform 130 to better learn and understand patterns of user behaviors over time to better classify and model user profiles over time.

The recommendation computing platform 130 performs compatibility analyses of registered users based on the user profiles that are maintained in the database 138 (block 404). In particular, in one embodiment, the recommendation computing platform 130 performs a compatibility analysis among multiple registered users using deep learning classification of the user profiles stored in the database 138. For example, the deep recommendation learning classification engine 350 (FIG. 3) classifies the preferences, activities, interests, etc. of registered users by analyzing the profiles of registered users (stored in the database 138) using trained recommendation classification models, to thereby identify registered users having potentially compatible preferences, activities, interests, etc. As part of the compatibility analysis (block 404), the deep recommendation learning classification engine 350 can utilize self-identified information in the database 136 to tune the classification analysis based explicit conditions specified by the user. In one embodiment, the processing of block 404 is a continuous or semi-continuous process that is performed in the background by the recommendation determination engine 135 to maintain updated compatibility results that can be used to push updated recommendations to registered users on a periodic basis via blocks 406, 408, 410.

The recommendation computing platform 130 will present to a given registered user, the profiles of other registered users who are deemed have a profile that is compatible to the profile of the given user (block 406). As part of the compatibility analysis (block 404), the recommendation determination engine 135 can determine compatibility scores (possibly weighted) for different aspects of user preferences, activities, interests, etc., and then aggregate the different compatibility scores to generate an aggregated compatibility score for each matching profile presented to a given user (block 408). For example, the compatibility between two registered users can be determined by comparing the compatibility scores of the different aspects of user preferences, activities, interests, etc. (e.g., emotional state, financial responsibility, religious views, political views, etc.), and then generating an aggregated compatibility score (block 408) based on the individual compatibility scores. This allows weights to be placed on different aspect of a user's profile in instances, for example, where a given registered user (either explicitly through self-identified responses, or implicitly through non-self-identified data) does not want, or places less emphasis, on certain aspects of user profile to be considered in the compatibility analysis. For example, a given user may not care if the person to whom she/he is potentially matched has strong or no religious convictions.

The recommendation computing platform 130 will provide recommendations to a given registered user (block 410) for possible matching user profiles, based the results of the compatibility analysis and the aggregated compatibility scores. For example, the recommendation computing platform will present one or more recommendations (e.g., suggested persons for dating or socializing) on a computing device of the registered user, along with user interface elements that allows the user to proceed with selecting one or more recommendations that are presented to the registered user.

The recommendation process can be bootstrapped using feedback from users as to whether smart recommendations to registered users were accepted or rejected (e.g., two matched persons have a successful relationship), which provides an additional layer of information that can be used to train the models that are used to determine compatibility scores. This is a continuous learning process as the classification models are updated over time based on user acceptance or rejection of recommendations.

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 5, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 5:
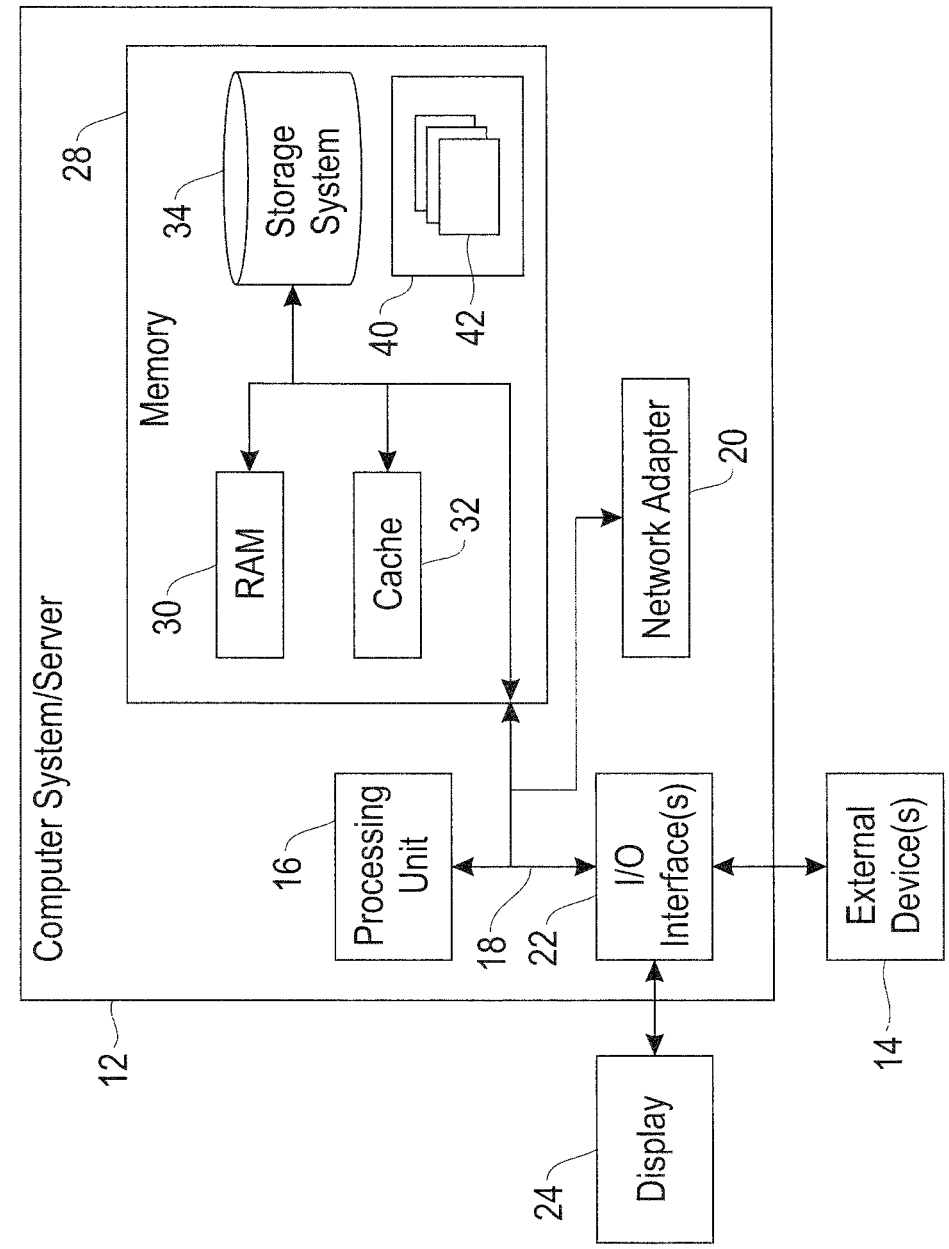
FIG. 5 is a system diagram of an exemplary computer system on which at least one embodiment of the invention can be implemented.

In FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
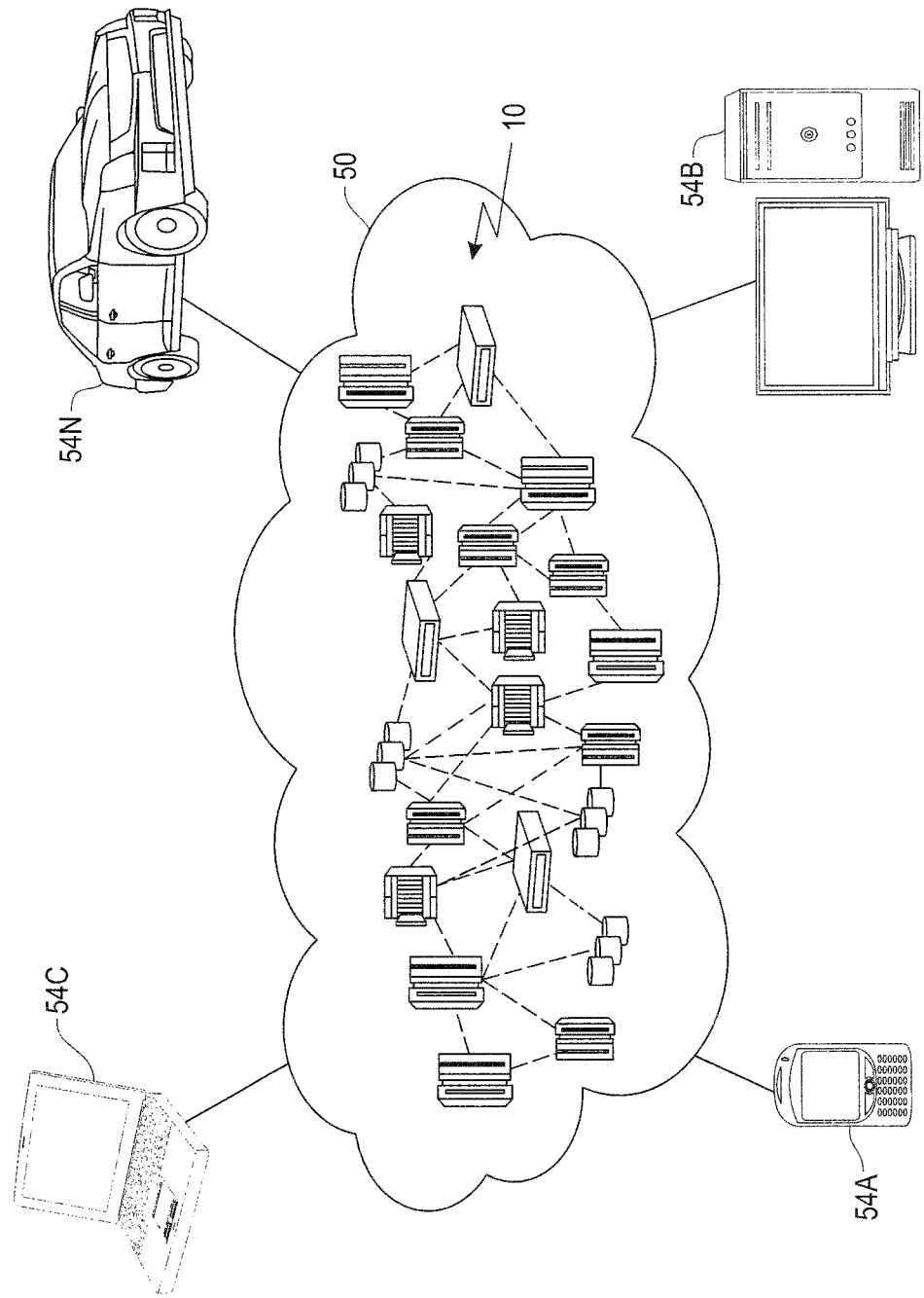
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
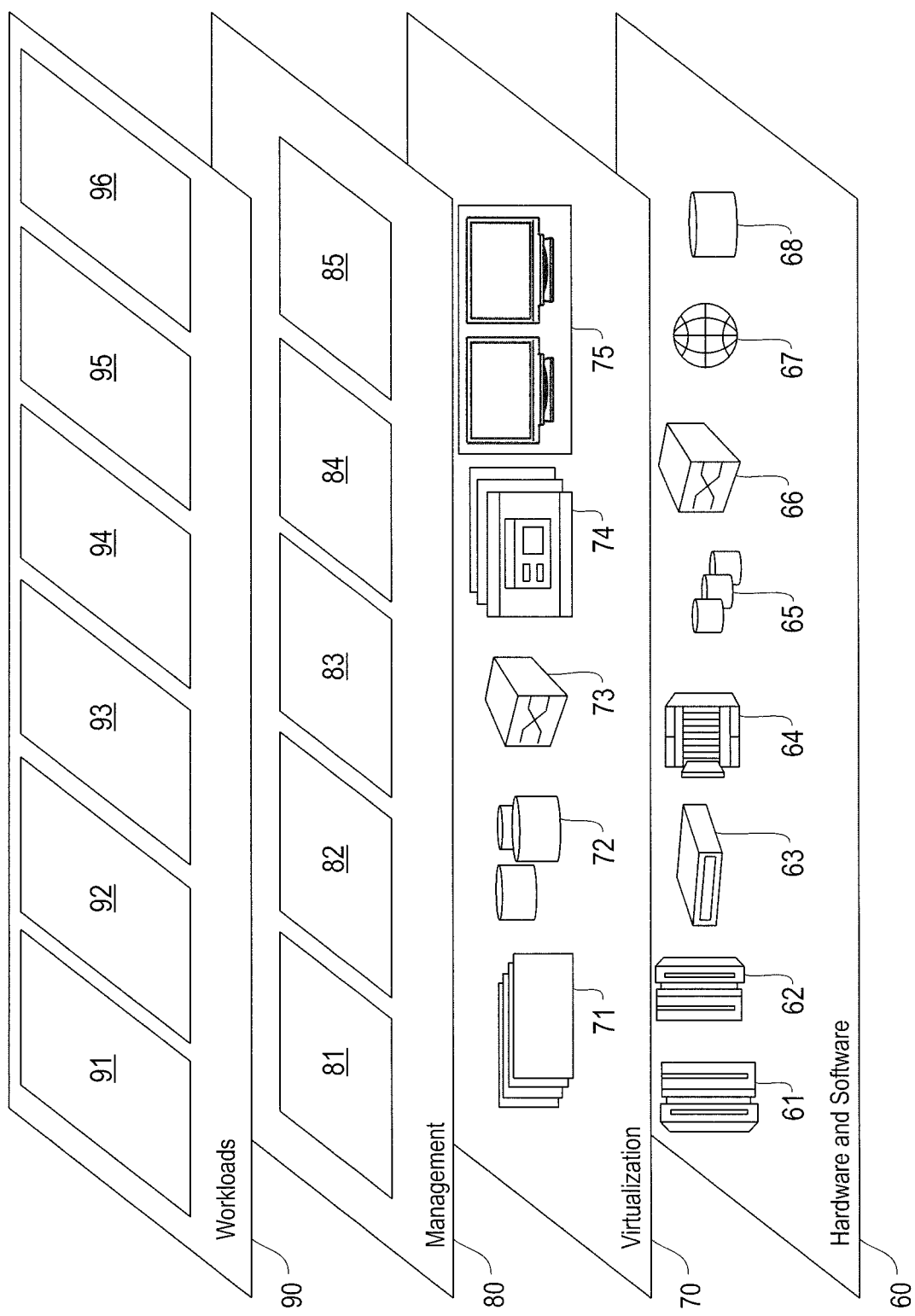
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various functions 96 implemented by the recommendation computing platform 130 in FIG. 1, and in particular, the various functions of the compute modules 131, 132, 133, 134, and 135 the recommendation computing platform 130, as discussed above with reference to FIGS. 1, 2, 3, and 4, to provide intelligent recommendations to user for various applications (e.g., dating, matrimonial, insurance, banking, etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A method, comprising:
   collecting multimodal user data from one or more computing devices of a user that is registered on a recommendation computing platform, wherein the multimodal user data comprise time-series data, unstructured textual data, and multimedia data, and wherein the one or more computing devices are network-connected to the recommendation computing platform;
   using a first deep learning classification engine to extract features from the multimodal user data, wherein using the first deep learning classification engine to extract features from the multimodal user data comprises:
   extracting a first set of features from the time-series data using a recurrent neural network;
   extracting a second set of features from the unstructured textual data using a deep Boltzmann machine engine; and
   extracting a third set of features from the multimedia data using a convolutional neural network;
   using a second deep learning classification engine to generate a profile of the registered user based on the extracted features;
   using a deep recommendation classification engine to determine at least one recommendation for the registered user based on the profile of the registered user, wherein the at least one recommendation comprises identification of at least one additional registered user on the recommendation computing platform;
   presenting the at least one recommendation to the registered user on at least one of the one or more computing devices of the registered user; and
   applying one or more unsupervised machine learning techniques to new multimodal user data to automatically update each of the recurrent neural network, the deep Boltzmann machine engine, and the convolutional neural network, wherein the one or more unsupervised machine learning techniques are applied as the new multimodal user data is collected over time.

2. The method of claim 1, further comprising aggregating the first, second, and third sets of features into a unified multidimensional feature vector, and using the second deep learning classification engine to analyze the unified multidimensional feature vector to generate the profile of the registered user.

3. The method of claim 1, wherein the time-series data comprise at least one of geolocation data, physiological data, calendar data, and phone call data.

4. The method of claim 1, wherein the unstructured textual data comprise at least one of text messaging data, data from electronic documents stored on the one or more computing devices of the registered user, and posts and comments from one or more social network sites.

5. The method of claim 1, wherein the multimedia data comprise at least one of image files, video files, and audio files.

6. The method of claim 1, wherein using the deep recommendation classification engine to determine at least one recommendation for the registered user based on the profile of the registered user, comprises performing a compatibility analysis to determine a compatibility score between the profile of the registered user and profiles of other registered users.

7. The method of claim 6, wherein presenting the at least one recommendation to the registered user, comprises recommending at least one other registered user who has a profile that is determined to be compatible with the profile of the registered user based on the compatibility score.

8. An article of manufacture comprising a computer readable storage medium having program instructions embodied therewith, the program instructions executable by a processor of a mobile computing device to cause the mobile computing device to perform a method comprising:
   collecting multimodal user data from one or more computing devices of a user that is registered on a recommendation computing platform, wherein the multimodal user data comprise time-series data, unstructured textual data, and multimedia data, and wherein the one or more computing devices are network-connected to the recommendation computing platform;
   using a first deep learning classification engine to extract features from the multimodal user data, wherein using the first deep learning classification engine to extract features from the multimodal user data comprises:
   extracting a first set of features from the time-series data using a recurrent neural network;
   extracting a second set of features from the unstructured textual data using a deep Boltzmann machine engine; and
   extracting a third set of features from the multimedia data using a convolutional neural network;
   using a second deep learning classification engine to generate a profile of the registered user based on the extracted features;
   using a deep recommendation classification engine to determine at least one recommendation for the registered user based on the profile of the registered user, wherein the at least one recommendation comprises identification of at least one additional registered user on the recommendation computing platform;
   presenting the at least one recommendation to the registered user on at least one of the one or more computing devices of the registered user; and applying one or more unsupervised machine learning techniques to new multimodal user data to automatically update each of the recurrent neural network, the deep Boltzmann machine engine, and the convolutional neural network, wherein the one or more unsupervised machine learning techniques are applied as the new multimodal user data is collected over time.

9. The article of manufacture of claim 8, further comprising aggregating the first, second, and third sets of features into a unified multidimensional feature vector, and analyzing the unified multidimensional feature vector using the second deep learning classification engine to generate the profile of the registered user.

10. The article of manufacture of claim 8, wherein the time-series data comprise at least one of geolocation data, physiological data, calendar data, and phone call data.

11. The article of manufacture of claim 8, wherein using the deep recommendation classification engine to determine at least one recommendation for the registered user based on the profile of the registered user, comprises performing a compatibility analysis to determine a compatibility score between the profile of the registered user and profiles of other registered users.

12. The article of manufacture of claim 11, wherein presenting the at least one recommendation to the registered user, comprises recommending at least one other registered user who has a profile that is determined to be compatible with the profile of the registered user based on the compatibility score.

13. The article of manufacture of claim 8, wherein the unstructured textual data comprise at least one of text messaging data, data from electronic documents stored on the one or more computing devices of the registered user, and posts and comments from social network sites.

14. The article of manufacture of claim 8, wherein the multimedia data comprise at least one of image files, video files, and audio files.

15. A system, comprising:
a recommendation computing platform comprising computing modules executing on one or more computing nodes of a network, wherein the recommendation computing platform is configured to:
collect multimodal user data from one or more computing devices of a user that is registered on the recommendation computing platform, wherein the multimodal user data comprise time-series data, unstructured textual data, and multimedia data, and wherein the one or more computing devices are network-connected to the recommendation computing platform;
use a first deep learning classification engine to extract features from the multimodal user data, wherein using the first deep learning classification engine to extract features from the multimodal user data comprises:
extract a first set of features from the time-series data using a recurrent neural network;
extract a second set of features from the unstructured textual data using a deep Boltzmann machine engine; and
extract a third set of features from the multimedia data using a convolutional neural network;
use a second deep learning classification engine to generate a profile of the registered user based on the extracted features;
use a deep recommendation classification engine to determine at least one recommendation for the registered user based on the profile of the registered user, wherein the at least one recommendation comprises identification of at least one additional registered user on the recommendation computing platform;
present the at least one recommendation to the registered user on at least one of the one or more computing devices of the registered user; and
apply one or more unsupervised machine learning techniques to new multimodal user data to automatically update each of the recurrent neural network, the deep Boltzmann machine engine, and the convolutional neural network, wherein the one or more unsupervised machine learning techniques are applied as the new multimodal user data is collected over time.

16. The system of claim 15,
wherein the recommendation computing platform is further configured to aggregate the first, second, and third sets of features into unified multidimensional feature vector, and analyze unified multidimensional feature vector using the second deep learning classification engine to generate the profile of the registered user.

17. The system of claim 15, wherein the recommendation computing platform is configured to use the deep recommendation classification engine to determine at least one recommendation for the registered user based on the profile of the registered user by:
performing a compatibility analysis to determine a compatibility score between the profile of the registered user and profiles of other registered users; and
recommending at least one other registered user who has a profile that is determined to be compatible with the profile of the registered user based on the compatibility score.

18. The system of claim 15, wherein the unstructured textual data comprise at least one of text messaging data, data from electronic documents stored on the one or more computing devices of the registered user, and posts and comments from social network sites.

19. The system of claim 15, wherein the multimedia data comprise at least one of image files, video files, and audio files.

20. The system of claim 15, wherein the time-series data comprise at least one of geolocation data, physiological data, calendar data, and phone call data.

* * * * *